_United States Patent_ [19]

Mulder

[11] Patent Number: 4,674,329

[45] Date of Patent: Jun. 23, 1987

[54] GAUGE FOR MEASURING THE LEVEL OR THE CONDUCTANCE OF A LIQUID PRESENT BETWEEN TWO ELECTRODES

[76] Inventor: Richard Mulder, Venkelstraat 8, 3252 BV Goedereede, Netherlands

[21] Appl. No.: 677,506

[22] Filed: Dec. 3, 1984

[30] Foreign Application Priority Data

Dec. 1, 1983 [NL] Netherlands ..................... 83204121

[51] Int. Cl.$^4$ ............................................. G01F 23/26
[52] U.S. Cl. ................................... 73/304 C; 361/284
[58] Field of Search .............. 73/304 C; 340/618, 620; 116/227; 361/284; 200/61.05

[56] References Cited

U.S. PATENT DOCUMENTS

| | | | |
|---|---|---|---|
| 2,230,137 | 1/1941 | Ewerte | 73/304 C |
| 2,741,124 | 4/1956 | Meyers | 361/284 |
| 2,752,543 | 6/1956 | Smith | 73/304 C |
| 2,849,882 | 9/1958 | Lee | 73/304 C |
| 3,230,770 | 1/1966 | Hermanson | 73/304 C |
| 3,596,517 | 8/1971 | Ryder | 73/304 C |
| 3,620,080 | 11/1971 | Ryder | 73/304 C |

FOREIGN PATENT DOCUMENTS 1569977  6/1980  United Kingdom .............. 73/304 C Primary Examiner—Charles Frankfort
Assistant Examiner—Thomas B. Will
Attorney, Agent, or Firm—C. O. Marshall, Jr.

[57] ABSTRACT

A gauge for measuring the height of a liquid in a vessel comprises a measuring electrode (M) and a compensation electrode (R) in the vessel, and a circuit which measures the capacitance $C_M$ of the measuring electrode and the capacitance $C_R$ of the compensation electrode, each with respect to a wall of the vessel as counter-electrode, using the liquid in the vessel as dielectric. The quotient $C_M/C_R$ varies with the height of the liquid in the vessel. The measuring electrode and the compensation electrode are parallel and of the same length, but differ in surface area and shape to such extent that such quotient varies as a linear function of the height of the liquid in the vessel.

9 Claims, 71 Drawing Figures

Type I

Type II

Type III

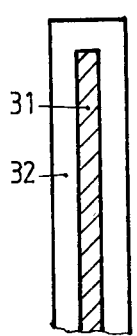
FIG. 7
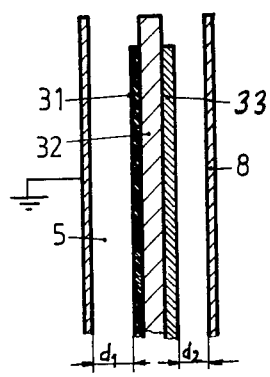
FIG. 8
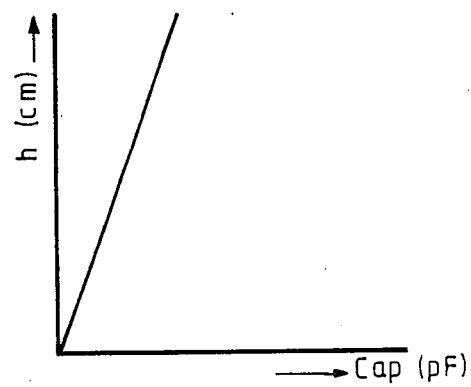
FIG. 9
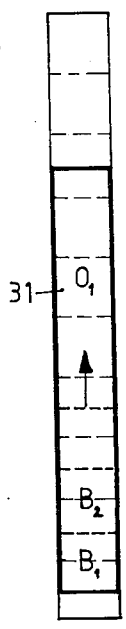
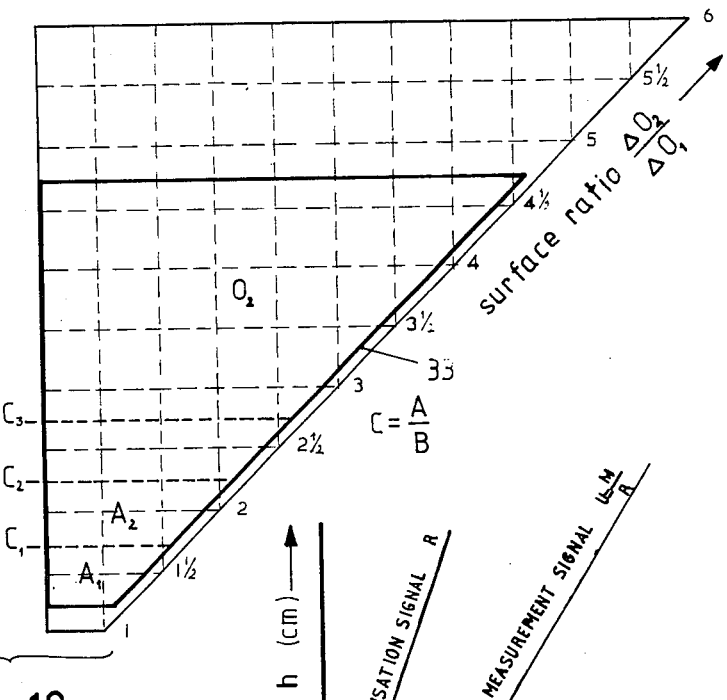
FIG. 10
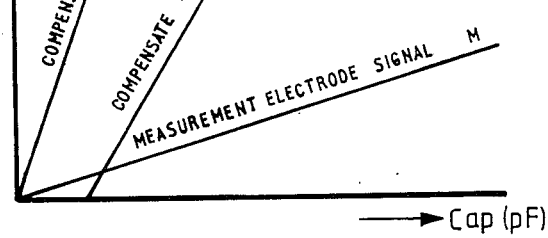
FIG. 11

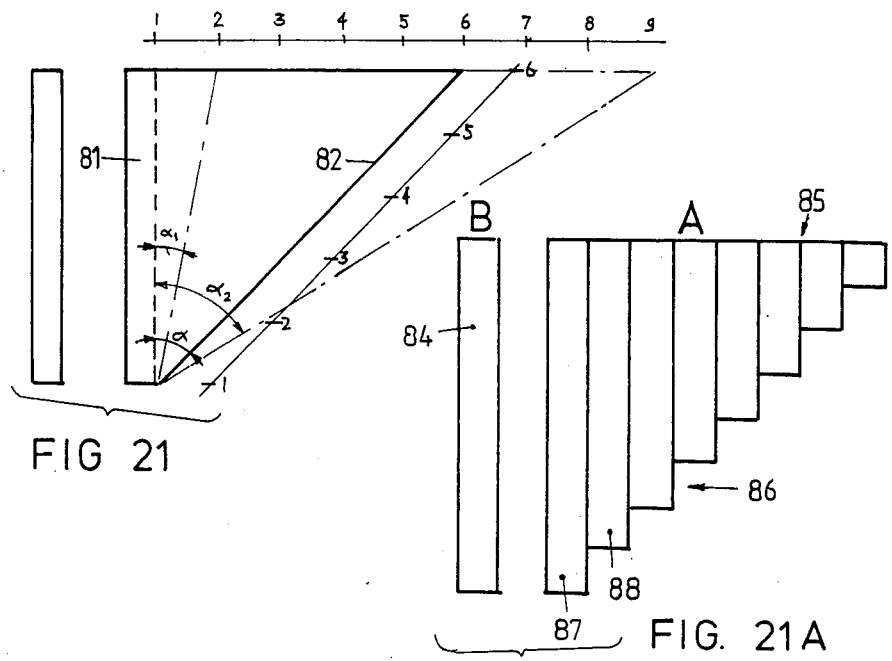
FIG 21
FIG. 21A
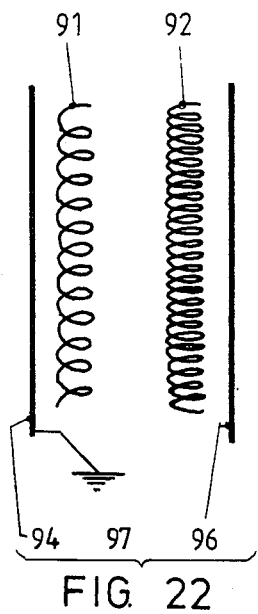
FIG. 22
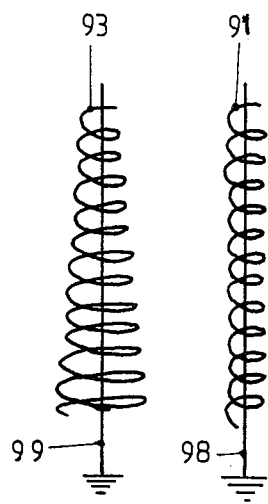
FIG. 23
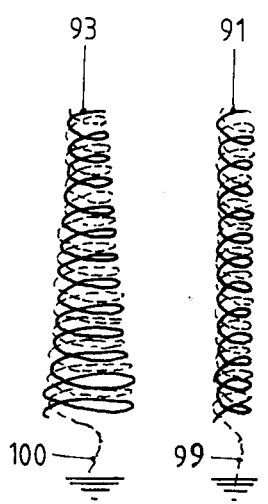
FIG. 24

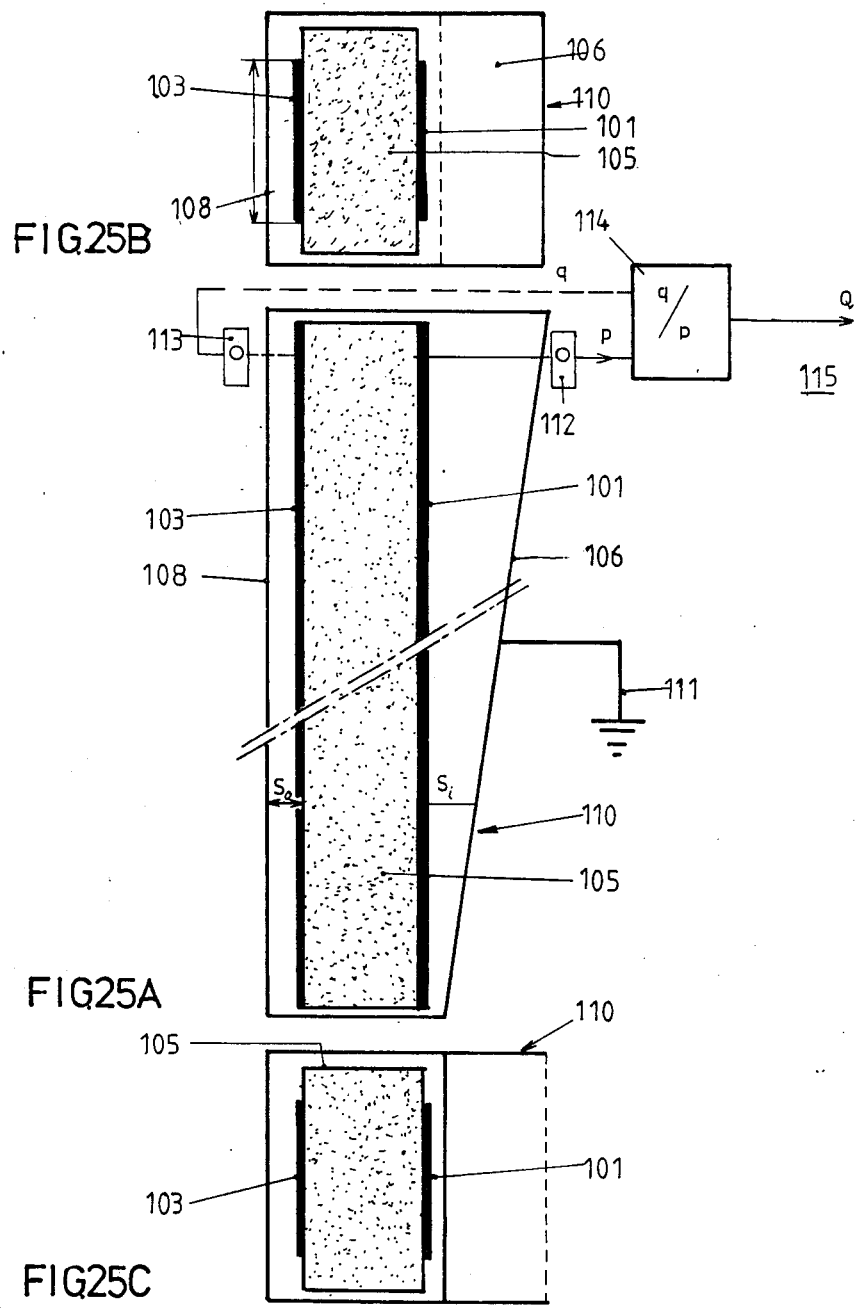

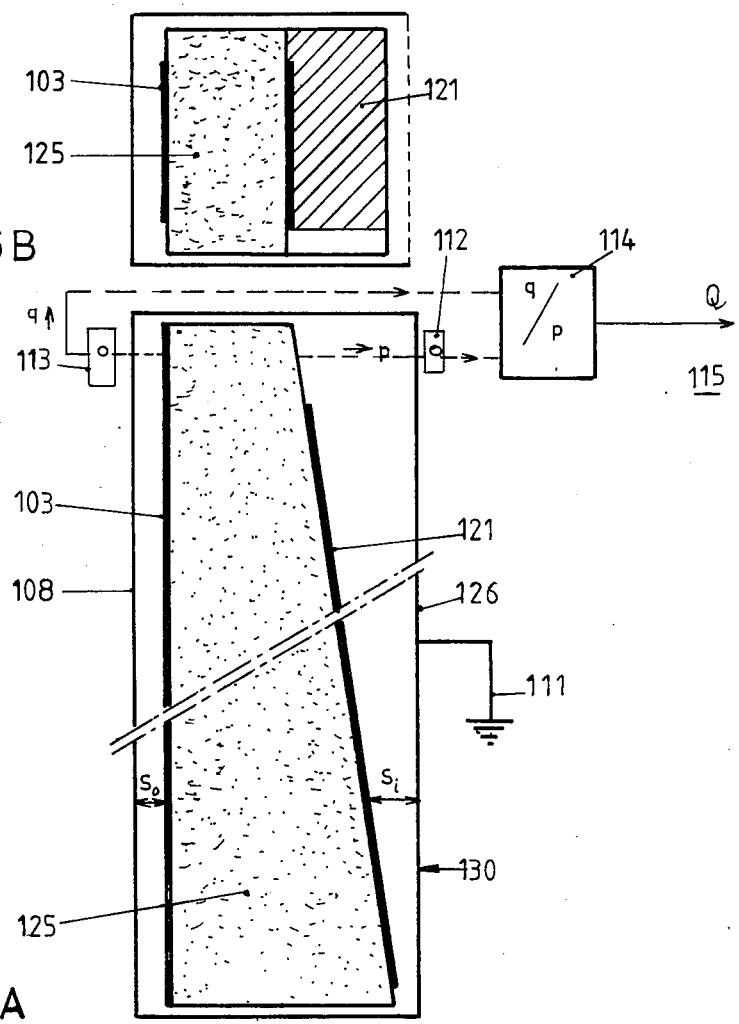
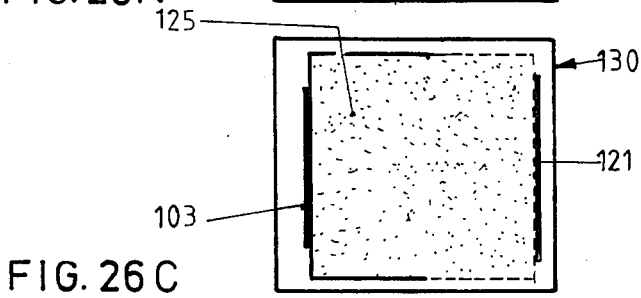
FIG. 26B
FIG. 26A
FIG. 26C

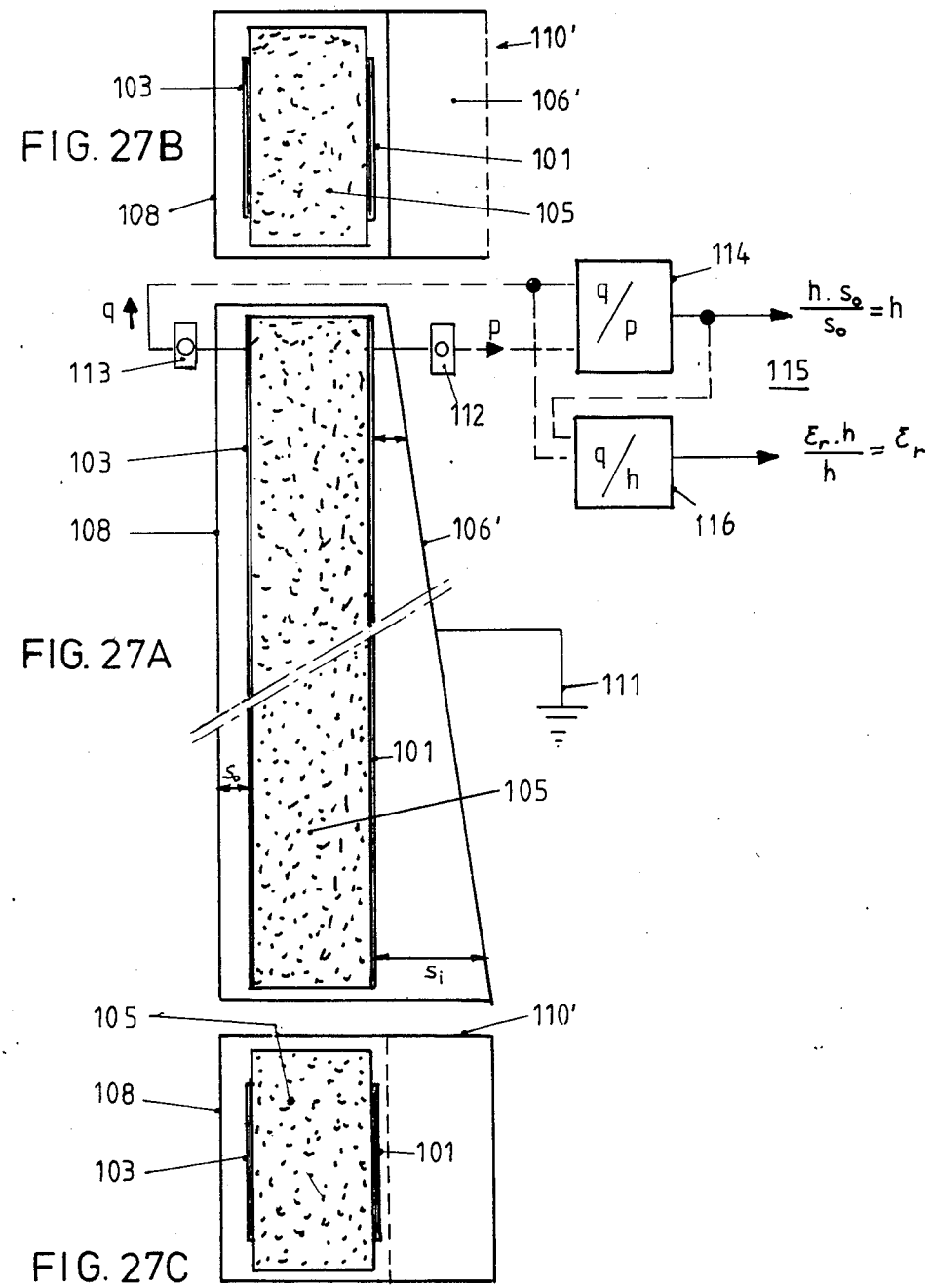

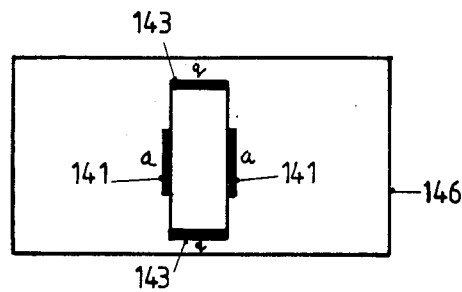
FIG. 29C
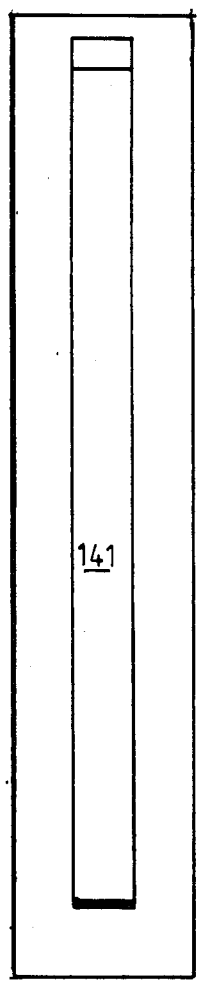
FIG. 29A →
FIG. 29B
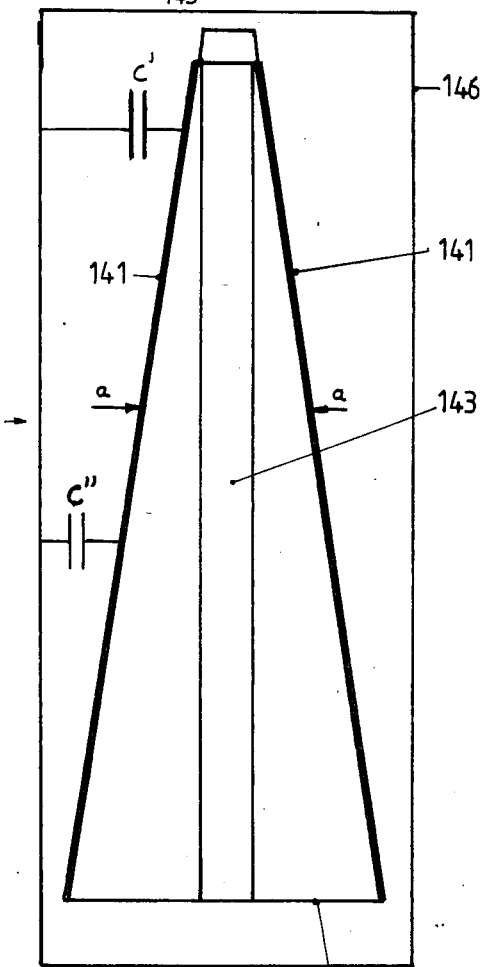
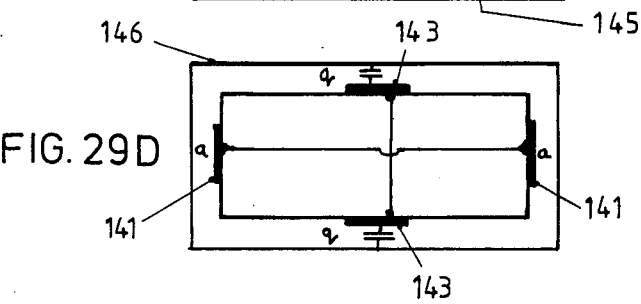
FIG. 29D

GAUGE FOR MEASURING THE LEVEL OR THE CONDUCTANCE OF A LIQUID PRESENT BETWEEN TWO ELECTRODES

The invention relates to a capacitive level gauge for measuring the liquid level in a vessel or flow-tube in a capacitive way, whereto a measuring electrode (M) and a reference electrode (R) are provided in the vessel or the like, which can cooperate with a wall or part thereof, acting then as counter-electrode to form capacitances ($C_M$ and $C_R$) with the liquid to be measured in the vessel or the like acting as dielectric, in which the quotient ($C_M/C_R$) is directly proportional to the liquid height.

Such gauges are being applied in liquid vessels, tanks (such as oil tanks of petrol service stations) and the like containers, in which the gauge does not only measures the liquid level, but also should be able to signalize any deviation from the composition of the liquid. Apart therefrom such gauges should be able to be used for controlling water levels in rivers and the like.

Thusfar level gauges could be divided into three categories:

I. The capacitive level gauge with one single electrode (standard gauge)
II. The capacitive level gauge with reference electrode (reference gauge)
III. Three terminal method with auxiliary electrode divided into parts.

I. The gauge of the first category

A rod-like measuring electrode is placed in the centre of the vessel or the like, because it cooperates with the wall of the vessel acting as counter-electrode. The capacitor so formed, is of the cylindrical type and its capacity is defined by the formula $$C = \frac{\epsilon_r \cdot 2\pi L}{\ln D/d} \; (pF) \quad (1)$$

in which
$\epsilon_r$ = dielectric constant of the liquid
L = the length with which the rod-electrode reaches into the liquid
D = the distance of the rod-electrode to the wall
d = the diameter of the rod-electrode The measured capacitance is proportional with L and hence a measure for the liquid height. In view of the big distance from the centre of the vessel to the wall of the vessel, the sensitivity of the gauge is not great. Another disadvantage is that the electrode does not extend to the bottom of the vessel and therefore the L is not quite the same as the liquid height H. There are still a number of other factors which affect the measurement, so that the eventual precision to be obtained is not better than ±2%. In many cases, however, this is amply sufficient.

Besides by placing the measuring electrode within a measuring tube, the sensitivity of the measurement is greatly enhanced. This measuring tube serves then as counter-electrode in the capacitor.

II. The gauge of the second category

In the extension of the central measurement electrode (M) at the lower-side thereof, is placed a reference electrode (R), which electrodes each form with the wall of the vessel or of the measuring tube a capacity $C_M$ or $C_R$. The quotient of these capacities yields a signal proportional to the liquid height because the capacity of the reference electrode, once the liquid in the vessel or the like has risen past the reference electrode, is constant. However, if the composition of the liquid (for example oil) in the vicinity of the reference electrode deviates from that of the liquid in the vicinity of the measuring electrode, it does have influence on the measurement of the quotient signal. However, it is not simple to take into account a correction for this type of error. Especially if water collects near the reference electrode, then as a consequence of the fact that the dielectric constant of water is 80 times that of air, the measurement evidently becomes disturbed to a large extent without it being known exactly how to correct this fault.

III. Three terminal method

Here the auxiliary electrode is constructed from a number of superimposed sub-electrodes being spaced mutually a certain distance. If a sub-electrode, somewhere on the sub-electrode, is partly covered with a liquid, said part can be measured between 0 and 100% of the scale. The sub-electrode, preceding the sub-electrode in consideration, is completely immersed into the liquid and serves as reference for changes in composition of the liquid. Still there is a portion above the measuring portion, which is completely in the gas phase; that upper portion serves as reference for changes in the gas-cap.

All covered electrode parts are processed in a memory so that the level can be measured rather precisely. The manner in which "references" are made, makes the gauge suitable for small level ranges, viz. corresponding to the height of each sub-electrode, which, by means of a memory, are summed up to the total height.

IV. Capacitive level gauge with automatic compensation

For the reasons afore-mentioned the reference-electrode (R) of the level gauge according to the invention has been replaced by a compensation electrode (C). This liquid gauge distinguishes itself therefore by the fact that the reference electrode is constructed as a compensation electrode, being of the same length as the measuring electrode and arranged parallel thereto, in which the difference in shape or surface area with respect to the counter-electrode between the measuring and compensation electrodes is such that the result of the division of the capacities ($C_M$ and $C_R$) indicates a linear relationship of the liquid height or a relationship of higher order.

Apart from these capacitive level measurements it is possible to measure the conductivity while using the same electrode arrangement. For, if the electrodes are bare (so not-coated against short-circuiting with the measuring tube), they can be used very well as electrodes for performing a conductivity measurement, provided the electronics therefor be adapted. The results are then quite the same as with the capacitive measurements. Also herewith changes in the conductivity of the liquids can be compensated automatically with the models hereafter to be discussed, or even—next to the height measurement—the conductivity itself can be determined.

The invention is therefore also related to a gauge for measuring the conductivity of a liquid, present between two opposite electrodes in a vessel or conduit pipe, to which end a measuring electrode (M) and reference electrode (R) are provided in vessel or the like, cooperating with a wall or part thereof, acting as counter-electrode, so as to form cells having a conductivity $a_M$ or $\alpha_R$ with the measuring liquid in the vessel or the like between said electrodes as conducting medium, in which the quotient of $\alpha_M$ and $\alpha_R$ is a measure for the conductivity of the liquid. This gauge is characterized in that the reference-electrode is formed as a compensation electrode of the same length as the measuring electrode and arranged parallel thereto, in which the differences in shape or surface area with respect to the counterelectrode between the measuring and compensation electrodes is such that the result of the division of the conductivities $\alpha_M$ and $\alpha_R$ indicates a linear relationship of the liquid conductivity or a relationship of higher order. Where in the following there is question of capacitances $C_M$ and $C_R$ resp.level or height, they can also be read as conductivities $\alpha_M$ and $\alpha_R$ resp..

Owing to this embodiment the compensation electrode "sees" at each level the same liquid compensation "seen" by the measuring electrode. Thus there cannot longer occur differences in the liquid composition which said one electrode does "see" and said other electrode does not "see". In this manner a kind of automatic compensation is obtained. This automatic compensation is due to the fact that the compensation electrode—contrary to the reference electrode—is of the same length as the measuring electrode. The associated electronics can be compared with the electronics of the reference-system, but it has more possibilities.

In a practical embodiment the compensation electrode is placed next to the measuring electrode and the two electrodes are provided on one and the same rod ("sandwich" type). The compensation electrode is in the simplest form a straight dimensioned element, provided on a plastics substrate.

On the other side is provided the measuring electrode. This entity, constructed as sandwich, is put in a square measuring tube forming the counter electrode both for the compensation electrode and the measuring electrode.

Since the compensation electrode is straight and is disposed parallel to a pair of opposing straight walls of the measuring tube, a capacity is measured therebetween, being directly proportional to the liquid height, as is also the case in formula (1) to wit $$C_C = \epsilon_r \frac{A}{s} \; (pF) \quad (2)$$

in which:
$\epsilon_r$ = relative the electrode constant of the liquid
A = surface of the immersed part of the electrode
S = distance electrode to measuring tube.
Since
A::h.B and
B = width of the capacitor plates, is a constant, it follows that $$C_C :: h$$

The measured signal of the compensation capacitance can therefore be compared with the output signal of the standard electrode (Category I).

On the other hand the compensation electrode can also be given a semi-cylindrical shape and be disposed parallel to a round measuring tube. The capacitance of the capacitor $C_C$ thus formed, satisfies the relation (I) and is again $$::L = ::h$$

The above considerations are also valid for a capacitor $C_M$ formed between the measuring electrode and the cooperating wall of a square or round measuring tube.

The division-result of $C_M$ and $C_C$ would then be no longer proportional with the liquid height whereas each of them separately is.

The invention is based on the recognition that there should be a difference in form between the two electrodes, because if the shape is the same, the division-result is no function of the liquid height.

For this reason the level gauge of the invention is characterized in that the compensation electrode has the shape of a rectangle and the measuring electrode that of a rightangled triangle. These "mathematical" shapes are applicable both on flat plates and on cylindrical plates. In this manner a continuous reading of the liquid height is obtained which appeared to be not possible thusfar with the existing liquid level gauges.

In principle the deviation in shape between the measuring electrode and the compensation electrode can be at random, provided the result of the division of the two capacities do not yield a constant, but a continuously increasing value with increasing height. By the above measure this leads to a linear relation, although another continuous relation is also useful.

The same linear relation is obtained, if the compensation electrode has the shape of a rightangled triangle and the measuring electrode that of a parabola.

Under certain circumstances it is of advantage when the slanting side of the triangle has a stepwise profile.

The new system lends itself for measuring both great differences in height over tens of meters, as in large storage tanks, and small differences in height of some centimeters. In the latter case, and if the horizontal dimension of the liquid basin permits same, a gauge is to be preferred, having in vertical direction smaller and in a horizontal direction greater dimensions. Then a gauge is used, characterized in that the mathematical relationship expressed by the shape of the compensation and measuring electrodes respectively, includes for each of them also a relationship of higher order, provided there be always between them a difference in order equal to one.

Now too the result is linear. If another than linear relation is desired, for example a square one, a gauge is recommended, characterized in that the shape of the compensation and measuring electrodes is such that the result of the division of the two capacitances ($C_M$ and $C_R$) indicates a relationship of second order. Preferably the measuring and compensation electrodes are provided on either side of one and the same insulating substrate or carrier.

Other applications of the present capacitive level gauge relate to:
A. Interface measurement
This subject includes the following sub-subjects:
 1. The precision and sensitivity resp. of the measurement with a "normal" oil-water mixture;
 2. Use of the triangle with a "reversed" two liquid layer system;
 3. Use of the triangle with a three liquid layer system.
B. Shaping of the triangle
This subject includes two sub-subjects:
 1. Wire-work realisation.
 2. Cooperation with grounded wire.
A. Interface measurement
 1. Sensitivity of the measurement The liquid gauge is suitable virtually for any liquid. But a particular application terrain is reserved for the present gauge when measuring the liquid level of hydrocarbons (oil or petrol) in storage tanks. When these liquids have just left the source, they contain a given percentage of water. In the formula for the capacitance, being a measure for the liquid level in the reservoir, $\epsilon_r$ plays an important role role. Its value is for oil equal to 2, but for water, being present in the oil in small quantities, $\epsilon_r = 80$. Or, if the water were homogeneously divided within the oil, then there were no problems, for, the average $\epsilon_r$ would be only a fraction greater than the $\epsilon_r$ of oil. The problems arise however, since the water is not dissolved into the oil, but spread irregularly within the oil.

If the sensitivity of the gauge is set for oil, because this is here the useful liquid, whereas the water is the undesired component of the mixture, and all of a sudden water appears in the region that functions as dielectric for the capacitor, then the gauge will not be able to work, will get over loaded and will not be able to accomplish any measurement of the oil liquid level, as long as that water is in the neighbourhood.

One has tried to neutralize this disturbing presence of water by homogenising the liquid flowing along the gauge, containing one moment water, the next moment no water, by means of a stirring apparatus, but this method is impractical, since one prefers to keep oil and water apart.

By means of the gauge according to the invention, it is possible, in spite of the presence of water in the crude oil, to measure the liquid level with reasonable precision over the entire height of the "vessel" without homogenisation.

An example as illustration:

(a) of the existing situation:

The signals $E_M$ (measuring capacitor) and $E_R$ (compensation capacitor) go to amplifiers being adjusted for measuring hydrocarbons with an average $\epsilon_r$ of about 2 with possible variations in $\epsilon_r$ of for example up to 2.5 in the dry state.

If one meets a water layer under the hydrocarbon level, then the amplifier will quickly be driven to its full power (into saturation) because $\epsilon_r$ of $H_2O = 80$ which variable is a multiplying factor in the capacitor-formula, so that further risings of the liquid level are not "noticed" by the gauge.

(b) of the improved situation:

The amplifier is driven (within its linear controlrange) to for example 50% of the scale-value for a full tank, filled with a liquid, of which $\epsilon_r = 2$ so that for liquids having a $\epsilon_r$ that varies between 1.5 and 2.5, the amplifier will be driven up to its full power, that means: is controllable over its total linear control range from 0 to 100%. The remainder (second half) of the scale range can be employed for variations in $\epsilon_r$ (up to 2.5) and for further risings of the liquid level.

2. Influence water content on the measurement

As long as the oil is "dry", the amplifier—on the base of the effectuated adjustments—can never be controlled or driven to beyond its linear control range (get overloaded). In normal cases the level indication is situated in a tank full of oil and a $\epsilon_r = 2$ at 50% of the scale. If this oil has a $\epsilon_r = 2.4$, then at 60% of the scale. Just because of fluctuations in the $\epsilon_r$ of oil, the provision is made to have a little clearance in the scale deflection in reserve. If, however, the oil is mixed with small quantities of water, thus when the oil is "wet", the output of the amplifier will increase to beyond 100% (beyond its linear range); the amplifier now becomes over-loaded (out of range). A circuitry provides for setting at that 100% a new "zero" capacity ($C_M$) but now at a higher measuring range, such that the amplifier is again driven to 50% (or half) of its linear controlling capacity for a $\epsilon_r$ variation of 2.5 to 3. This switching-over is indicated visually by the glowing-up of a LED.

If the amplifier exceeds again its maximum (100%) linear controlling (due to a new layer of water, or still due to the "old" layer) switching-over to higher scale-ranges will continue until at last a range is found, in which the amplifier can operate between 50 and 100% of its controlling capacity.

Each time that the thickness of the water layer occurring in the oil between the electrodes, exceeds a given threshold value, in which the output of the amplifier is driven up to full power (more than 100%) and thus the amplifier becomes "over-loaded", this switching over towards a higher measuring range takes place, for example for every 2.5 cm thickness of the water layer. The number of glowing LED's indicates then how often and switching-over has occurred and how thick the total water layer between the electrodes is.

To this end the capacitive level gauge according to the invention is characterized in that for measuring the interface between an underlying heavier liquid and a superimposing useful liquid, the triangle electrode is placed into the liquid having its narrow side turned downwards.

Thus finally in the result of the measured liquid height two inexactitudes can be present, which are caused by the fact that (a) the oil liquid, for which one has started from a value $\epsilon_r = 2.0$, comprises a component with a higher $\epsilon_r$-value, for example 2.4;

(b) the water as a whole has not yet reached the layer thickness at which switching-over to a higher measuring range occurs. This is also valid, when switching-over has already taken place one or more times, for the still remaining $H_2O$, if any.

These deviations, however, remain completely within the precision conditions which this kind of gauge is subjected to by the Inspection of Weights and Measures. The imperfections are therefore virtually negligible, so that it can be stated rightfully that thanks to the measures according to the invention, viz.

using the driving or controlling capacity of the amplifier only for 50% of its linear range;

switching-over to a higher measuring range, and signalling each of these transitions with for example LED-indication (or a counter), the level measurement itself by the presence of these "disturbing" components, is not affected essentially.

If the measuring amplifier switches-over, the reference amplifier will change along, proportionally, so that the ratio between the two capacities ($C_M$ en $C_R$) remains the same. In this way too the level measurement has not changed.

The numerical water thickness indication by LED's (or counter) can be replaced by an analogous indication.

2. Use of the triangle with a "reversed liquid system".

(a) In the preceding part of the specification there has always been question of a straight electrode for the reference signal and a triangular electrode (called "triangle") having its narrower part turned downwards for the measuring signal, when there is question of a "normal" oil-water-system, in which water is in the minority. In that case oil is the useful liquid which is to be measured. Thanks to the aforementioned measure the water is, as it were, eliminated, so that always a half scalerange is left for controlling the useful liquid (oil) in the event that oil with a higher $\epsilon_r$ value (2.5 instead of 2.0) is present in the liquid. In that case the triangle is disposed "correctly". In order to judge whether the triangle is disposed "correctly" or "wrong", one should watch the interface line, that means the bordering line between two liquids. In the "normal" case the underlying liquid is for example water ($\epsilon_r = 80$) and the superimposed, lighter in weight, liquid is for example oil ($\epsilon_r =$ circa 2).

If the vessel is (almost) full with oil, the interface line is virtually near the bottom. The ratio of the surfaces wetted by water is then $O_1:O_2 = 1:1\frac{1}{2}$.

If the vessel is (almost) completely filled with water, the interface line is (nearly) at the top. The ratio of the surfaces wetted by water is now $O_1:O_2 = 1:5\frac{1}{2}$.

Between these ratio-limits (minimum=1 and maximum=6 when the slanting side of the triangle forms an angle of 45° with the vertical) it should be possible to measure the interface. It is clear that interface measuring requires quite another adjustment of the control capacity of the amplifier, whereas besides always should be taken into account fluctuations in the $\epsilon_r$ of the oil.

(b) In the "reversed" case there is in the lower-part of the tank a heavy oil layer, for example "ECH" (ethylchloroheptane, $\gamma = 4$ to 5, $\epsilon_r = 2.4$). On this liquid the water, being lighter in weight, floats.

If the vessel is (almost) completely filled with the heavy oil, the interface is (nearly) at the top, and the ratio between the surfaces is $O_1:O_2 = 1:10\frac{1}{2}$.

In the event that the vessel is (almost) completely filled with water, the interface is (nearly) at the bottom and the surface ratio is $O_1:O_2 = 1:6\frac{1}{2}$.

It will be clear that in such a case the gauge operates "reversely". The gauge measures with increasing quantity of water a diminishing surface ratio, viz. from 1:11 (maximum) tot 1:6 (minimum). On the scale it would become necessary to read from 100% to 0%. In order to exclude this "illogical" situation, the triangle is, each time that the "interface" measurement occurs in a "reversed" liquid system, reversed too. Thus when the vessel is (almost) completely filled with oil, the interface is (almost) at the top and for the surface ratio is valid: $O_1:O_2 = 1:1\frac{1}{2}$.

In the case that the vessel is (almost) completely filled with water, the interface is (nearly) at the bottom, and the surface ratio with increasing water quantity is $1:5\frac{1}{2}$. By this reversal of the triangle it is possible with increasing quantity of water in the vessel, to measure between surface ratios from 1-11.

Remark: Heretofore it has been explained that on applying the gauge in a "reversed" liquid system the triangled measuring electrode must be reversed. However, when in the dividing operation the components of the quotient are reversed, thus $C_R/C_M$ and $C_R/C_m$ are determined, the same result is obtained, however, without reversal of the measuring electrode.

4. Three liquid layer system

If the composition of the liquid in the vessel is such that the heavy oil is in the lower part of the vessel, water floating thereabove and a light weight oil layer floating on said water, then the two interfaces can be monitored by means of a double electrode system of compensation and measuring electrodes, in which the triangles of both systems are disposed opposite each other in mirror image reflection with respect to a horizontal plane and are facing each other with their narrow sides. The interface of the upper two-liquid system is measured by the upper electrode system, and the lower interface of the lower two-liquid system by the lower electrode system.

However, it will be clear that depending on the specific weight of the components in a combination of three liquids, also those cases can occur, in which the two triangles are disposed each with their narrow side turned downwards, or turned upwards, or are facing each other with their wide side in mirror image reflection.

This system can be extended, without any restriction, to any number of interfaces, in which the position of the triangles opposite each other is defined by the specific weight of the liquids, which meet each other at the interface.

B. Shaping of the triangle

1. Wire-work-configuration

The rectangular compensation electrodes and the triangle measuring electrodes can be constructed as a panel, but in a particular simple form. Also as spatial wire-work-figures.

The rectangular electrode is then replaced by a cylindrically wound coil, and the triangle electrode by a conically wound coil, or also a straight coil, but with a greater density of the turns. This is accompanied with a considerable loss of capacitive surface. To compensate for that loss, the counter electrode is brought closest possible to the main-electrode, so that the D in the denominator of the capacitor formula becomes smallest possible. This can be executed in several manners, of which three will be mentioned here:

(A) A grounded tube, whose inner surface functions as counter-electrode, is placed around the two electrodes or around each of them separately.

2. Cooperation with grounded wire (B) One places in any of these wire electrodes centrally a straight, grounded wire.

(C) One places in the spaces between the turns of the wire-electrodes the turns of the grounded counter-electrode constructed as a similar wire-work figure. Doing so particular small dimensions are obtained between corresponding wire parts of the main electrode and the counter-electrode and therefore an extremely small D.

C. Measurements based on distance-variation

The invention further relates to a capacitive level gauge for measuring the liquid level in a vessel or conduit pipe in a capacitive way, whereto a measuring electrode (M) and a compensation electrode (R) are provided in the vessel or the like, cooperating with a measuring tube acting as counter-electrode, in which the compensation electrode is of the same length as the measuring electrode and arranged parallel thereto.

In an older proposition there is question of a measuring electrode cooperating with a wall part of the measuring tube. The measuring electrode can be considered as a right angled triangle and the compensation electrode as a straight narrow strip. A level gauge provided with such a measuring electrode can be used for level measurements with great precision.

The invention has for its object to propose other combinations of measuring electrode and measuring tube, which are based on the same principle and with which the same, great precision can be obtained. Hence, according to the invention in a main embodiment of this principle the measuring electrode (M) and the wall part of the measuring tube acting as counter-electrode, are disposed opposite each other, so that the distance inbetween, in horizontal direction, is variable—whereas the distance between the compensation electrode (R) and the opposite wall part of the measuring tube is constant—so that division of the capacitances ($C_M$ and $C_R$) yields a linear or higher order relationship with the liquid height to be measured.

In the older proposition the distance from the measuring and compensation electrodes to the associated wall of the measuring tube remains constant. Solely the surface of the measuring electrode increases with the second power, whereas this remains constant in the gauge according to the invention.

In a first embodiment of this main-idea, this leads to the measure, that the wall part of the measuring tube opposite the measuring electrode (M) and/or the measuring electrode itself is slanting. The compensation electrode and cooperating wall of the measuring tube are in principle straight. They can also be slanting, provided they remain parallel to each other.

This can anyway be realised in two different manners. In the first place such that for use in a 'normal' liquid (for example oil-water) system the wall part of the measuring tube cooperating with the measuring electrode is inclined, its bottom edge being nearer to the axis of the gauge than its top edge. Under a 'normal' two-liquid layer system, here oil-water, is to be understood a system in which the useful liquid (oil) floats on a layer of the polluting liquid (water).

In the second place this is possible in that for use in a 'normal' liquid system the wall part of the measuring tube cooperating with the measuring electrode is straight, while the measuring electrode itself is inclined, its top edge being nearer to the axis than its bottom edge. In these cases measurement of the reversed quotient of $C_M$ and $C_R$, so $C_R/C_M$ leads to a rising linear relation with the height of the liquid level.

In the case of a 'reversed' liquid-system one has to see to it, that when one likes to measure the reversed quotient $Q'=C_R/C_M$, the greatest distance between the measuring electrode and cooperating wall of the measuring tube is at the lower end and the smallest distance therebetween is at the upper end.

Remark: it will, however, be clear that for obtaining a directly proportional relation between the quotient and the liquid level, one can also take the quotient $Q=C_M/C_R$ (as in the older patent application) and that when applying the gauge in a normal liquid system, provision has to be made that at the upper end the distance between measuring electrode and cooperating wall of the measuring tube, is smaller than at the lower end, but when applying the gauge in a 'reversed' liquid system, provision must be made that the distance at the upper end is greater than at the lower end.

For convenience's sake an electrode carrier body is applied, on which the measuring and compensation electrode are applied. A preferred embodiment is constructed such that in a symmetrical arrangement of a multi-sided carrier-body for the electrodes, the wall parts of the measuring tube on the one and on the other sides, cooperating with the measuring electrodes on the one and on the other sides, and/or said measuring electrodes themselves are inclined, whereas the compensation electrodes are provided on the carrier-body opposite each other on the two other sides and have a constant distance with respect to the opposed wall parts of the measuring tube.

Another embodiment of the carrier body is constructed such that the carrier-body has in cross-section the shape of a triangle, and in that the measuring electrodes are provided on two sides and the compensation electrode on the third side. Of course, the carrier-body can also be formed as a body of revolution (cone, cylinder and the like).

Apart therefrom that the main electrodes are mutually fixed on a substrate or carrier-body, it is also—in view of the close cooperation between the main electrodes and corresponding (electrode material coated) wall parts of the measuring tube—practical to compose all these parts to one integral entity. Therefore the invention proposes that the main electrodes (measuring electrode and compensation electrode) and the measuring tube acting as counterelectrode, form together an integral unit, which, when inserted into a liquid vessel, is galvanically insulated therefrom. In this manner a gauge is obtained, which can be inserted into a vessel or conduit pipe (piping) as a separate measuring unit, namely separated therefrom galvanically. A galvanic separation means that the measuring tube with the electrodes unbreakably connected therein, is electrically insulated against the vessel or the conduit-pipe. The above facts are in contradiction with a conventional level gauge of the standard type, where the (measuring) electrode inserted into the vessel just forms with that vessel or conduit-pipe a capacitive unit (capacitor). The measurement takes place therefore between the wall of the vessel and the electrode.

These gauges can also be applied in multi-liquid layer systems with two or more 'interfaces'. In that case one puts on or below the measuring tube section, having an inclined wall part, whose lower end is nearer to the axis than its upper end, another section having likewise an inclined wall part, but whose lower end is farther from the axis than its upper end. The total wall of the combined measuring tube sections or measuring electrodes exhibits a kink, viz. an outwardly directed (or 'convex') kink or an inwardly directed (or 'concave') kink. Of course more than one of these kinks can be applied, also combinations thereof. Hence, it is recommended to apply in such situations a measuring tube, characterized in that the wall part cooperating with an electrode and/or the electrode itself exhibit one or more kinks.

Since over great heights of the liquid level gauge the inclination of the wall or of the measuring electrode can lead to an unacceptable extent of the gauge, measures are proposed to meet this inconvenience, viz. in that the wall part cooperating with the measuring electrode is formed with a stepwise profile and the measuring electrode itself is divided correspondingly into mutually separated sub-electrodes. All this boils down to the fact that the level gauge is divided into a number of individual level gauges, in which the inclined wall of the tube section each time jumps back (is off-set). In the measuring circuitry proper each time a switching-over to a high measuring range occurs.

The invention need not relate exclusively to level measuring apparatus. It is quite well conceivable that the construction shapes are also applicable to other measuring situations, for example: in through-flow installations, pressure measurements, weight technics, wind tunnel, conductivity etc.

The invention is hereinafter described with reference to the accompanying drawings, in which FIG. 1 shows a level gauge of the prior art, provided with one electrode;

FIG. 7 shows a level gauge with compensation electrode;

FIG. 8 shows a structure thereof in a measuring pipe;

Figure 12:
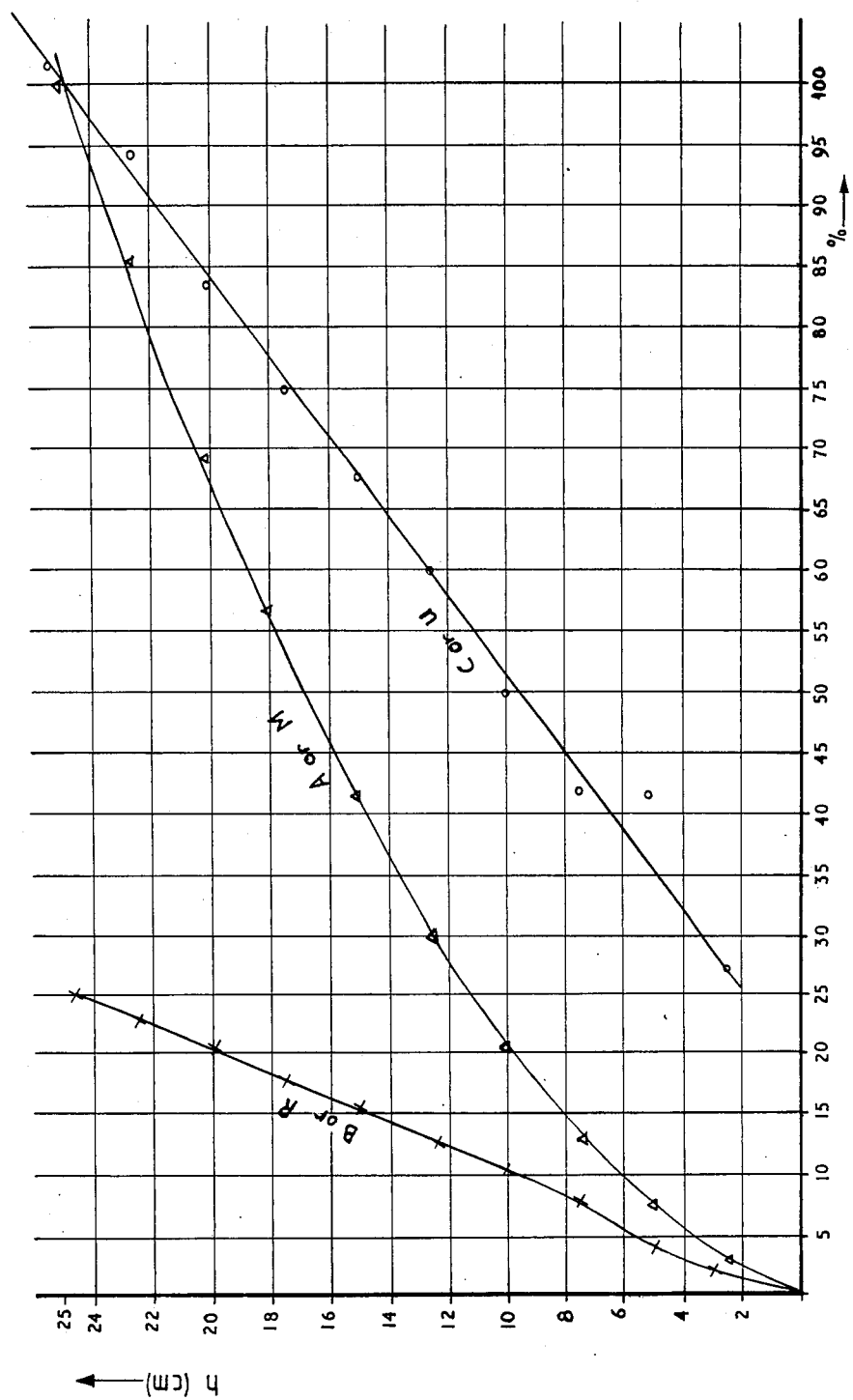
Figure 13:
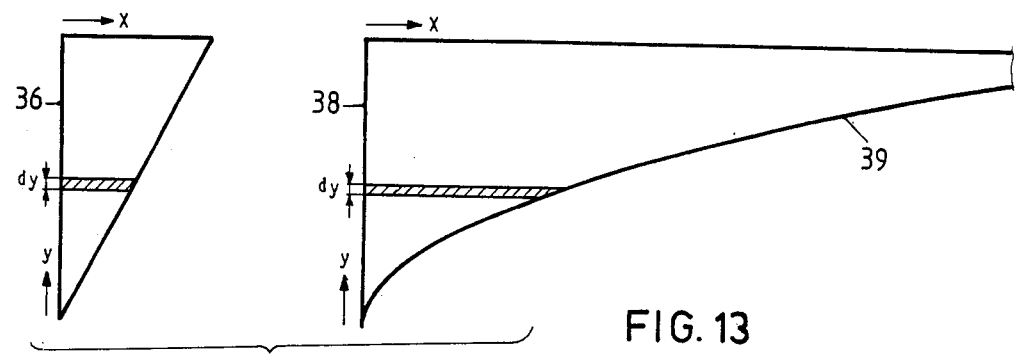
Figures 14A, 14B:
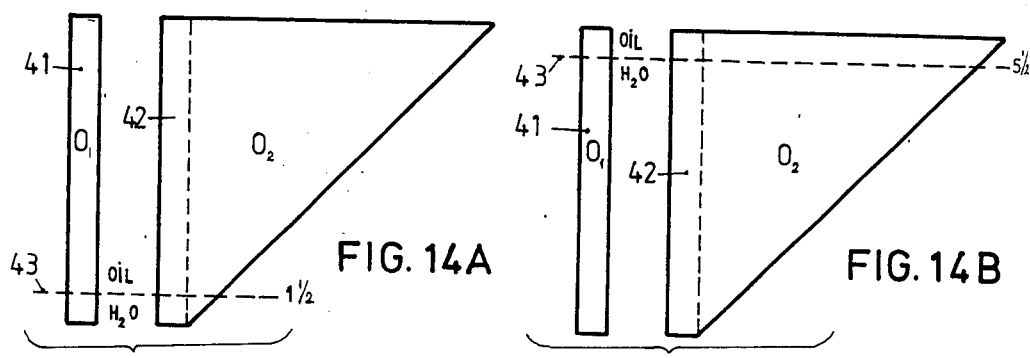
Figures 15A, 15B:
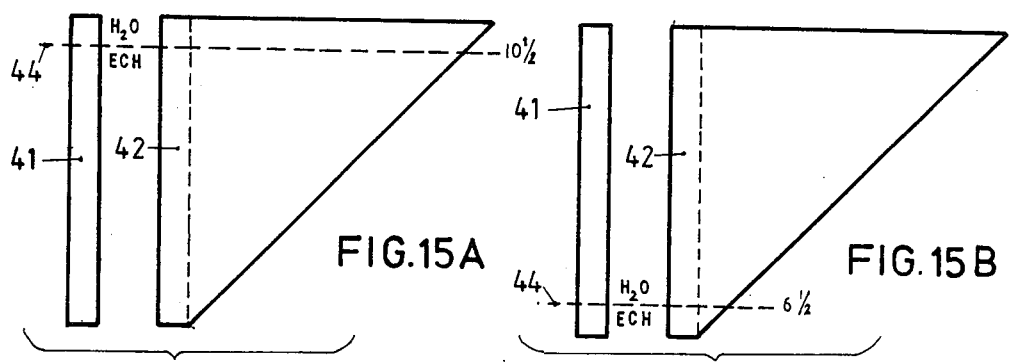
Figures 16A, 16B:
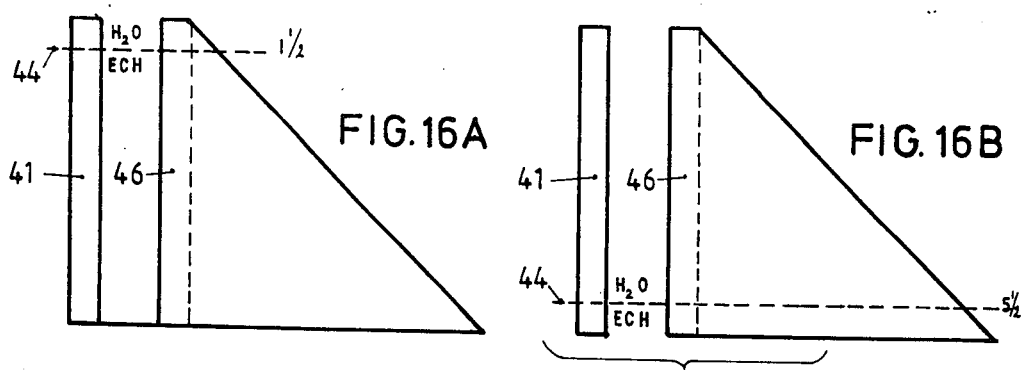
Figure 31A:
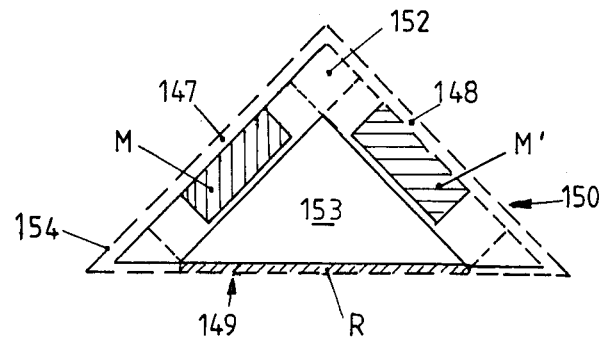
Figure 32A:
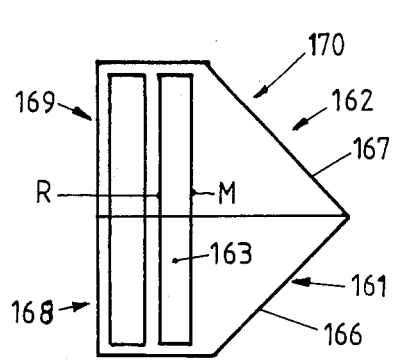
Figure 32B:
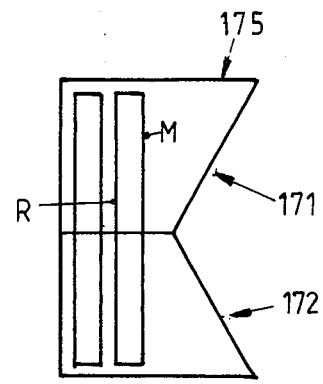
Figure 32C:
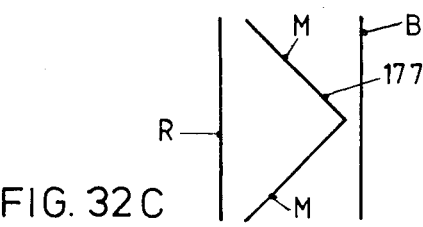
Figure 32D:
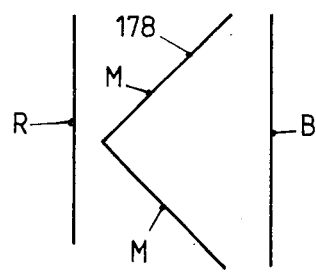
Figure 32E:
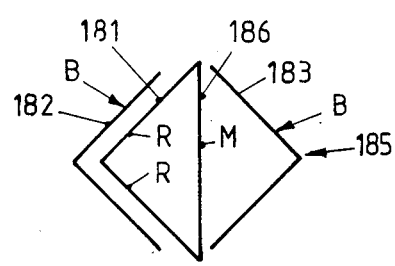
Figure 33A:
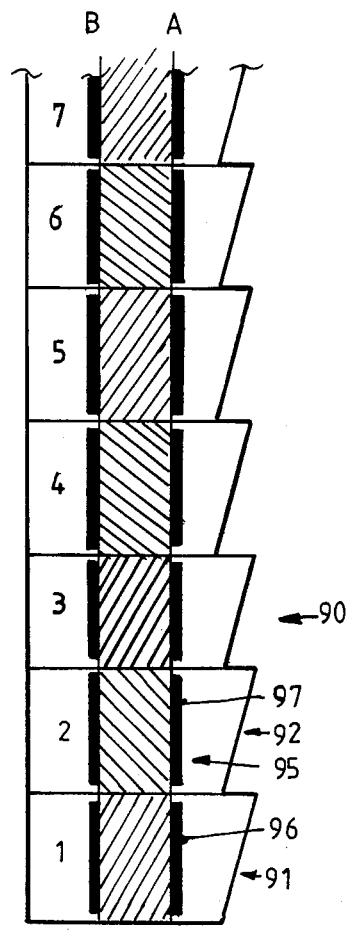
Figure 33B:
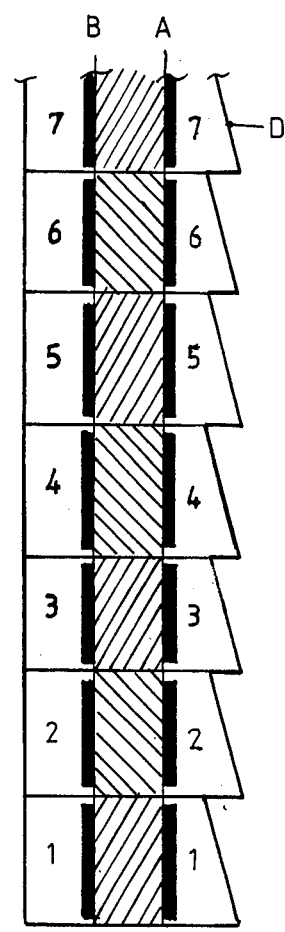

FIG. 9 indicates the relation between the height of the liquid and the measured capacitance;

FIG. 10 shows a level gauge with compensation electrode according to the invention;

FIG. 11 illustrates the relation between liquid height and the measured capacitance, analogous to FIG. 9;

FIG. 12 is similar to FIG. 11, but indicates the measuring points, so as they really have been found;

FIG. 13 shows an alternative of the embodiment of FIG. 10;

FIGS. 14A, B show an electrode arrangement of a level gauge according to the invention with a "normal" two-liquid layer system;

FIGS. 15A, 15B show the same electrode arrangement of FIG. 14, applied to a "reversed" two-liquid layer system;

FIGS. 16A, B show the same as in FIG. 15, but now the electrode arrangement has also been reversed;

FIGS. 17–20 show four possible electrode arrangements, to be used with various three-liquid layer systems;

FIG. 21 shows again a three angular measuring electrode, in which the influence is investigated of modifying the position of the slanting side;

FIG. 21A shows a modification of the triangled electrode, such as for example illustrated in FIG. 10;

FIGS. 22–24 show electrode arrangements in which the electrodes are constructed as wire-work figures;

FIGS. 25A–C show a first embodiment of the invention, in which one wall of the measuring tube is inclined, the lower part of said one wall being closer to the measuring electrode than its upper part;

FIGS. 26A–C illustrate an alternative embodiment of FIG. 25, in which the measuring electrode is inclined, its lower part being closer to the associated wall of the measuring tube than its upper part;

FIGS. 27A–C show another alternative of FIG. 25 for a "reversed" liquid system;

FIGS. 28A–F are illustrative for the term "reversed liquid system";

FIGS. 29A–D and FIGS. 30A–D show a second embodiment, in which the carrier of the electrodes has four sidewalls of which to opposed walls are inclined;

FIG. 29 for a normal liquid system;

FIG. 30 for a "reversed" liquid system;

FIGS. 31A and B show an alternative embodiment of FIG. 29, in which the electrode carrier is in cross-section triangular; FIG. 31 shows an embodiment in which the measuring tube or electrode is conical;

FIGS. 32A–E show an embodiment, in which two or more measuring tube sections, as represented in FIGS. 25–27, are combined together, so that the combination of measuring tube sections and/or electrodes exhibits on the transition place between the sections, a kink; and FIGS. 33A and B show an embodiment in which the sections of the measuring tube connect to each other stepwise.

Figure 1:
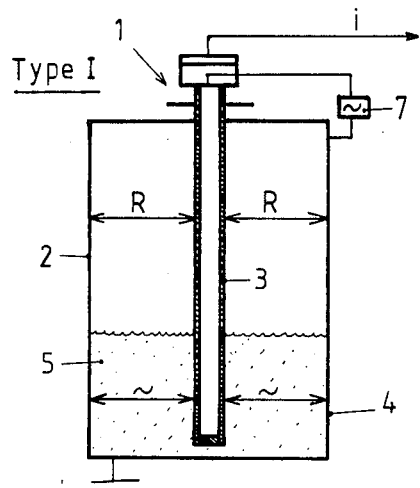

In FIG. 1 is shown a level gauge of the standard type, being placed in a liquid vessel 2. The gauge is inserted into the cylindrical vessel 2 by means of a cnetrally arranged cylindrical pin 3 covered with electrode material or any other cylindrical object. The wall 4 of said vessel functions as counter-electrode. With the liquid 5 as dielectric between the electrodes 3, 4 the determination of the liquid height in the vessel is reduced to a capacitance measurement, when between the cylinder-plate shaped electrodes an alternating voltage of voltage source 7 is connected.

Figure 2:
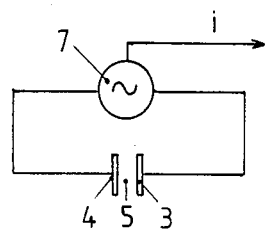
FIG. 2 shows the electric circuitry thereof.

The capacitance of the capacitor thus formed is proportional with the height, over which the measuring electrode 3 is inserted in the liquid 5. The electric circuitry is shown in FIG. 2. The signal i obtained from the liquid measurement can be transformed directly into a height-reading, expressed in cm or m, if may be desired.

Since the radius R appears in the denominator of the capacitor formula, the capacity of the capacitor formed is small and therefore also the sensitivity.

Figure 3:
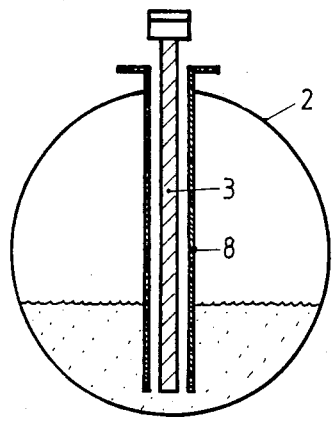
FIG. 3 shows a measuring arrangement of the prior art of the type in FIG. 1, placed within a metal measuring pipe.

By putting the measuring electrode into a pipe or tube, this objection can be met with. In FIG. 3 the measuring electrode 3 is disposed centrally within a measuring pipe 8, functioning as counter-electrode in substitution or the vessel wall 2. Inhomogenities in the liquid cannot be measured by this gauge. Also the measured height does not quite correspond with the real height. One can provide therefor a fixed correction, so that still the correct value can directly be read.

Figure 4:
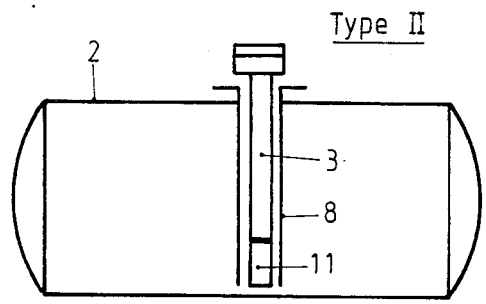
FIG. 4 shows a second type of level gauge, also of the prior art, but with a second electrode as reference electrode.
Figure 5:
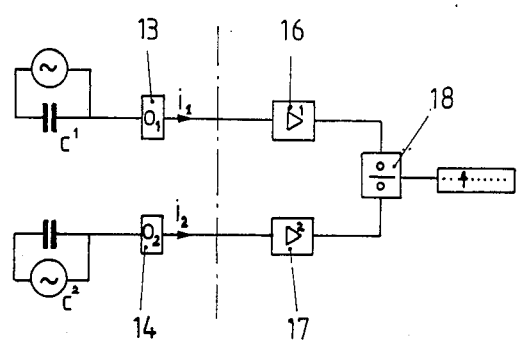
FIG. 5 shows the electric circuitry thereof.

In FIGS. 4 and 5 is shown a second type of a known capacitor level gauge, in which a reference electrode 11 is applied. This reference electrode allowed to eliminate the influence, which changes in the dielectric constant of the liquid can have on the measurement, within given limits and provided the liquid be homogenous.

If the liquid is not homogeneous in composition, greater deviations with the reference electrode can arise than with a normal standard measurement. As shown in FIG. 4 the measuring electrode 3 is on its lower side provided with a reference electrode 11. The whole thing is put into a steel measuring pipe 8. When the reference electrode is completely covered, the signal issued will only change by a modification of the dielectric constant $\epsilon_{rx}$ of the liquid to be measured.

The measuring signal of the reference electrode is passed to the amplifier 17 (FIG. 5) via oscillator 14. The measuring signal of the measuring electrode is passed to amplifier 16 via oscillator 13. Both signals are passed to an amplifier 18, which conducts the division such that only the level height is shown. If now the dielectric constant of the liquid changes, this will have no effect on the reading, that means: will not be observed by the gauge.

The above statement only holds if the dielectric constant changes over the entire measuring region. Further the change in dielectric constant may not be greater than ±10% of the original value. When the greater changes occur, the amplifier cannot handle this sufficiently so that deviations will occur.

The disadvantages of the reference measuring system are that not all effects which can disturb the measurement, are eliminated, such as among others the fact that the dielectric constant of the liquid near the bottom of the vessel—thus at the reference electrode—can be considerably greater than at the measuring electrode. If the reference electrode has some pollution, this can influence the reference signal. Because the reference electrode is placed down in the vessel, the change of pollution is there greatest. The gauge can only function well if the reference electrode is completely covered with liquid. The lower part in the vessel can therefore not be measured.

As appears from the above remarks, the reference measurement is not always reliable and only very restrictively usable.

Figure 6:
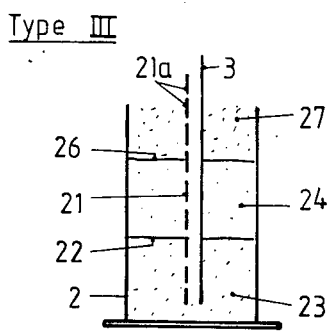
FIG. 6 shows a third type of level gauge, again of the prior art, but with an electrode divided into sub-electrodes.

In FIG. 6 a third type of known capacitive level gauge is shown, in which next to the measuring electrode a split reference electrode 21 is present. By the division of the reference electrode 21 into a plurality of small sub-electrodes 21A, inhomogeneities in the dielectric can be determined more exactly, so that a similar device for localising the intermediary plane or interface 22 between two liquids 23 and 24, and the interface 26 between the liquid 24 and the gas cap 27 is suitable. The disadvantages of the previously discussed reference measuring system can be removed with an automatic compensation system, FIGS. 7–9. In the compensation system on each level of the measuring electrode 33 a feed back is given, originating from a compensation electrode 31. The compensation electrode 31 is put next to the measuring electrode 33 and mounted on the same carrier rod 32. The two-electrodes are of the same length. The associated electronics can be compared with the electronics of the reference system (FIG. 5) but has more possibilities, as will be discussed later on. The compensation electrode 31 is in principle a straight dimensioned element, provided on a plastics substrate 32 (FIG. 7). The electrode is placed into for example a square measuring pipe 8, forming one plate of the capacitor, such that $d_1=d_2$. The compensation electrode 31 measures with respect to the measuring pipe 8.

The signal issued by the compensation electrode 31 is shown in FIG. 9; one obtains a linear relationship. The same applies to the measuring electrode itself, so that on dividing the signals, the quotient is a "constant" and the system as such is unsuitable for automatic compensation.

In FIG. 10 is shown a measuring system according to the invention. The measuring electrode 33 is in principle disposed next to the compensation electrode 31 and measures directly proportional with respect to the measuring pipe 8 (not-shown), of which the wall acting as counter-electrode, is spaced a distance d from and parallel to the electrodes 31 and 33. The fact that the surface of the measuring electrode is divided by the surface of the compensation electrode 31 explains why the measuring electrode 33 in the upward direction must linearly increase in surface area, in order to obtain a measuring signal that is directly proportional with the liquid height. As can be seen easily, in the system of FIG. 10 holds the relation $$C = A_i/B_i$$

in which $A_i$ and $B_i$ are the sub-surfaces of the measuring electrode 33 and the compensation electrode respectively. Elaboration of the formula gives:

$$C_1 = \frac{0 \cdot A'_1}{0 \cdot B'_1} = 1\tfrac{1}{2} X.$$

$$C_2 = \frac{0 \cdot A'_2}{0 \cdot B'_2} = 2 X.$$

$$C_3 = \frac{0 \cdot A'_3}{0 \cdot B'_3} = 2\tfrac{1}{2} X. \text{ etc.}$$

X = capacitance associated with the liquid level.

From the preceding formula it appears that the output signal of the differential amplifier is directly proportional with the liquid height, independent of the course of the dielectric constant of the liquid and the gas cap.

Both signals M and R can be represented in one figure, inclusive the compensated output signal U (FIG. 11). The disadvantages adhering to the two preceding measuring systems, are eliminated with the compensation system. With said compensation system is obtained a purely capacitive measuring signal that does not deviate from the real liquid height.

FIG. 12 is identical to FIG. 11, but on a larger scale, in which the experimental measuring points are represented exactly.

In FIG. 13 is shown a second embodiment of the measuring system according to the invention, with compensation electrode. In this embodiment the compensation electrode 36 is formed as a triangle, whereas the measuring electrode 30 has one of its sides formed as a parabola 39.

In FIGS. 14A, B is shown an electrode-arrangement consisting of a rectangular compensation electrode 41 and a triangular measuring electrode 42. This arrangement is the same as that of FIG. 10. The electrodes are placed into a 'normal' two-liquid layer system, for example oil and water, of which system the interface line is shown as dotted line 43. In FIG. 14A it is supposed that the vessel (not shown) is almost completely filled with oil. The interface line 43 is therefore 'down'. The ratio of the water wetted surfaces of the two electrodes 41, 42, so the quotient Q or the ratio $O_2/O_1$ is—as can easily be calculated—equal to $1\tfrac{1}{2}$. In FIG. 14B it is assumed that the vessel is 'almost' full with water. The interface 43 is therefore 'up' and the ratio of the surfaces is $5\tfrac{1}{2}$. In the extreme case there must be a controlling range between the minimum value (=1) of the quotient and its maximum value (=6).

In FIGS. 15A, B the electrodes 41, 42 are placed into a 'reversed' two-liquid layer system, that is a system in which the useful component (oil) is not above the useless component (water), but below it. In FIG. 15A it is supposed that the vessel is (almost) completely filled with ECH and thus the dotted line of the interface 44 is drawn 'up'. That position corresponds with a surface ratio of water wetted surfaces of $10\tfrac{1}{2}$. In FIG. 15B it is supposed that the vessel is (almost) completely filled with water. The interface 44 is 'down' and yields a Q = $6\tfrac{1}{2}$. In this case with increasing quantity of water in the vessel, the quotient Q will decrease; in the extreme case from 11 to 6. This is illogical.

Hence in FIGS. 16A, B the triangular electrode 46 has been turned upside down. In FIG. 16A the value of Q is now $1\tfrac{1}{2}$ when there is little water in the vessel and $5\tfrac{1}{2}$ when there is much water in the vessel. So doing the gauge of the 'reversed' liquid system operates similarly as in FIG. 14 for the 'normal' liquid system, viz. from 1 to 6.

In FIGS. 17–20 are shown electrode arrangements 51, 52 which can be employed, if in a vessel, tank or storage container a three-liquid layer system is present, with two interfaces 53, 54.

Figure 17:
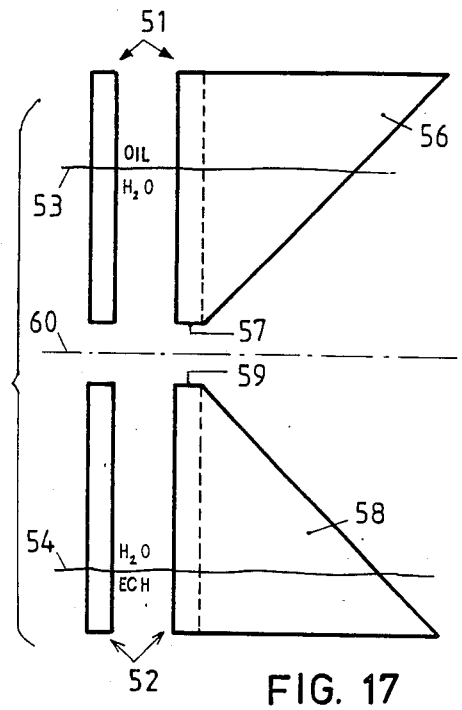

In FIG. 17 the case is shown that the upper two-liquid system (oil-water) is a 'normal' system, so that the triangle 56 of the measuring electrode has its narrow side 57 turned downwards. The lower two-liquid system (water-ECH) is however a 'reversed' system and therefore the triangular electrode 58 has also been reversed and its narrow side 59 is turned upwards. One can also say that the two electrode arrangements have been mirror-image reflected about the symmetry-axis 60.

Figure 18:
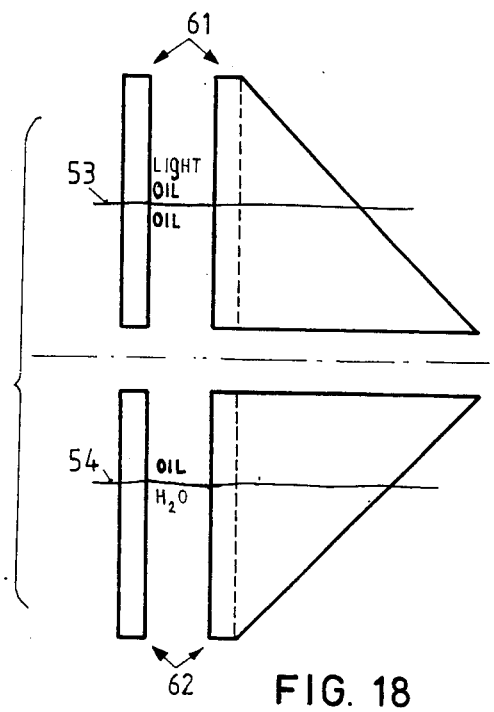

In FIG. 18 the two-electrode arrangements 61, 62 have also been mirror-image reflected mutually, but now the normal electrode arrangement 62 is 'down' and the 'reversed' arrangement 61 is 'up'.

Figure 19:
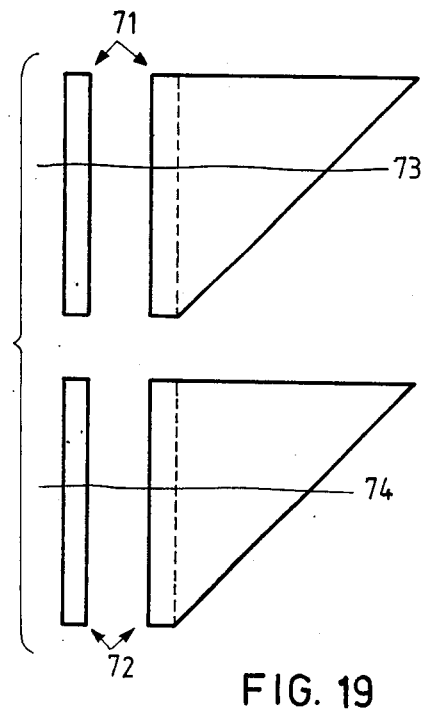
Figure 20:
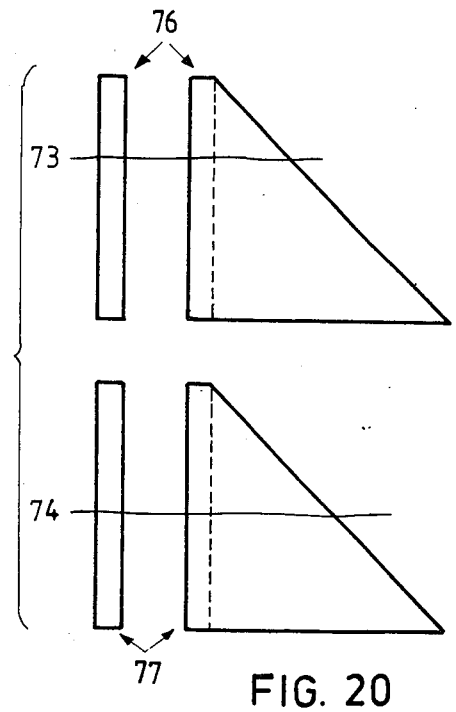

In FIGS. 19 and 20 there are still shown two other electrode arrangements 71, 72, 76, 77, in which in FIG. 19 there is question of two normal two-liquid layer systems, one atop the other, and in FIG. 20 of two 'reversed' two-liquid systems, one atop the other.

The triangular electrode 81 drawn in the preceding figures, has always been shown as an isosceles rightangled triangle, thus in which the slanting line forms an angle $\alpha = 45°$ with the vertical. In that case the quotient Q varies, depending on the height of the interface, between 1 and 6. Other angles are also possible and give rise to other values of Q. In FIG. 21 these values and intermediate values are plotted along the slanting side 82. At the top side number-values for Q have been denoted for the maximum that can be reached when the angle is modified and thus the inclination of the slanting line of the triangle. If this slanting line is given an angle $\alpha_1$ and $\alpha_2$ respectively, the value of the maximum Q is 2 and 9 respectively.

The electrode 85, shown in FIG. 21A, has a slanting side 86 with a stepwise profile. This electrode 85 can be thought to be composed of a number of narrow sub-electrodes 87, 88 etc. of ever-decreasing length or in the reverse case: of ever-increasing length, which are combined to one electrode-output. The electrodes 84, 85 are placed into a measuring tube, measured with respect to said measuring tube and connected therewith unbreakably. The measuring tube and electrodes as a whole are galvanically separated from and placed into a vessel. Galvanic separation means that the combination is disposed electrically insulated with respect to the vessel, in which the measurements take place.

FIGS. 22-24 do not show the electrodes as panels, but as wire-works (101, 102). The excess in surface, which the measuring electrode 102 must have with respect to the compensation electrode 101 is found in a much higher winding density (102 in FIG. 22) or a conical winding (103 in FIG. 23). In comparison with a panel shaped electrode, the wire-work configuration has undergone a loss of surface, so that the electrostatic capacity is also much smaller. This is compensated for by diminishing the distance d. In FIG. 22 is therefore placed around both electrodes 101, 102 a tube 104, whose inner wall 106 is covered with an electrode coating, being grounded at 107.

In FIG. 23 is applied, in the place of a grounded tube, a grounded wire 108, 109 disposed within the turns of the electrodes 101, 103.

In FIG. 24 the grounded wire itself is also wound 111,112 and placed with its turns within the spaces between the turns of the electrodes 101, 103, so that an extreme small d can be obtained.

In FIG. 25A is shown a level gauge according to the invention in side view, also in plan view (FIG. 25B) and in bottom view (FIG. 25C). Contrary to the older application—but also destined for a normal two-liquid system—where the surface of the measuring electrode, when considered in an upward direction, increases faster than that of the compensation electrode, and where further the distance between the electrodes and the associated wall of the measuring tube placed around said electrodes, remains constant, the distance between measuring electrode 101 and associated wall parts 106 of the measuring tube 110 increases, whereas the ratio of the surfaces of the measuring electrodes 101 and the compensation electrode 103 remains constant.

The measuring electrode 101 forms with the slanting wall part 106 a capacitor $C_M$ with variable distance s. The compensation electrode 103 forms with the wall part 10 a capacitor $C_R$ with constant distance s. The electrodes 101, 103 are applied on a carrier 10. The measuring tube 110 is grounded at 111. On the upper side of the measuring tube 110 measuring circuitry 115 is present, including two oscillator circuits 112, 113 and a divider circuit 114. The oscillator circuits 112 and 113 resp. are connected to the capacitors $C_M$ and $C_R$ resp. and furnish signals p and q resp. to the divider-circuit 114. The capacity of $C_R$ is $$\frac{\epsilon_r \cdot A}{s_o} = q \text{ and that of } C_M \text{ is } \frac{\epsilon_r \cdot A}{s_{avg}} = p$$

wherein $A = h_i \cdot r$ (for r, see FIG. 25B) = electrode surface, and $\epsilon_r$ = dielectric constant of the liquid to be measured. For the distance s should be taken the average value of the distance $s_o$ in the lowest point of the electrode and the distance $s_i$ in the highest point of the liquid at a given moment.

Since the variable s occurs in the denominator of the capacitor formula, one has to determine the quotient $Q' = q/p$, so that $s_{avg} = s = \frac{1}{2}(s_o + s_i)$ appears in the numerator of the quotient. This means that an increasing liquid height $h_i$ is accompanied with an increasing value of s. It follows that the height to be determined is directly proportional with the measured quotient Q, which is a linear function of the distance. In the standard embodiment the electrodes and the inner wall of the measuring tube can be coated with PTFE to protect the electrodes and the measuring tube against possible corrosive liquids.

FIG. 26A illustrates an alternative embodiment of the invention in FIG. 1, likewise with a side view (FIG. 26A), plan view (FIG. 26B) and bottom view (FIG. 26C) and with an electric measuring circuit 115. As far as there is question of equal parts as in FIG. 25, the same reference numerals will be applied. Parts with a different construction-form have received another reference numeral. That is the case with the measuring electrode, now 121, which is not straight, but inclined. Further the measuring tube 130, which instead of the slanting side 106, has a straight side 126. The carrier 125, which was in cross-section rectangular, is now in cross-section a trapezoid. Also here the distance between measuring electrode and cooperating side of the measuring tube increases with rising liquid.

In FIG. 27 is shown again an alternative form of the level gauge of FIG. 25 in side view (FIG. 27A), plan view (FIG. 27B) and bottom view (FIG. 27C), in which equal parts have been indicated with the same reference numerals. In this case the wall 106′ of the measuring tube 110′ cooperating with the measuring electrode 10 is tapering in an upward direction, so just the reverse of FIGS. 1 and 2.

This situation is the reverse of that of FIGS. 1 and 2, when watching the distance $s_i$. If one wishes to apply this arrangement in a normal liquid system, then the quotient $Q = p/q$ must be determined to ensure that a linear relation is measured between the height $h_i$ and the distance $s_i$. This case is shown in the measuring circuit 115. Via a small modification it is possible to determine by means of another sub-circuit 116, to which are supplied the signal q and the result of the division Q carried out in the circuit 114, the dielectric constant $\epsilon_r$ of the liquid, so that the presence, if any, of traces of water in the oil, which is present between the electrodes of the capacitor, can be detected.

If, on the contrary, the signals p and q are supplied to the divider-circuit 114 such that the quotient $Q = q/p$ is measured, then a simple calculation teaches that this kind of construction is suitable for a 'reversed' liquid system, which will be explained with reference to FIGS. 28A-F.

From all this, it follows that a given arrangement being suitable for a normal liquid system, need not be reversed per se in order to be suitable for a 'reversed' liquid system. It suffices to exchange the connector pins for the signals p and q mutually in the divider-circuit 114.

Figure 28A:
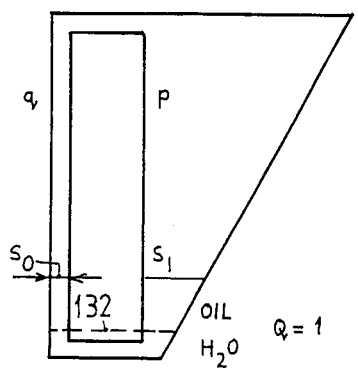
Figure 28:
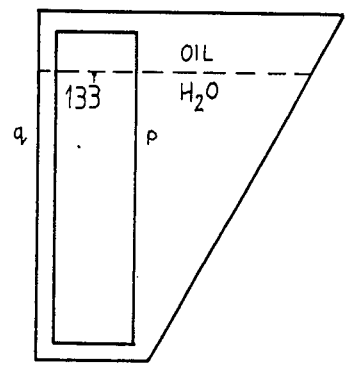

FIGS. 28A and B represent the level gauge for use in a 'normal' two-liquid layer system. In FIG. 28A is supposed that the vessel is full of oil, and in FIG. 28B full of water. At the place of the interface 32 in FIG. 28A, the quotient of $C_R$ and $C_M$ is:

$$Q = \frac{q}{p} = \frac{\text{const.}}{s_0} : \frac{\text{const.}}{N \cdot s_0} = N_1, \text{ for example } = 1$$

At the place of the interface 33 in FIG. 28B the quotient Q is:

$$Q = q/p = N_{10},$$

for example = 10. So a rising water level is detectable by an increasing value of N.

Figure 28C:
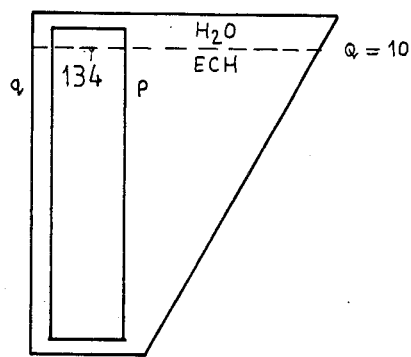
Figure 28:
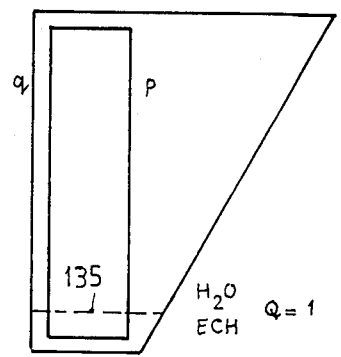

FIGS. 28C and 28D show schematically the case that the level gauge according to the invention is applied in a 'reversed' two-liquid layer system, in which the usual ECH is heavier than water and is thus below the interface. In FIG. 28C it is supposed that the measuring vessel is almost completely filled with ECH, so that the interface 34 is in the upper part of the vessel. In FIG. 28D, on the contrary, the vessel is nearly completely filled with water and so the interface 35 is virtually in the lower part of the vessel. At the place of the interface 34 the quotient $Q = q/p$ has a high value, for example 110, whereas at the place of the interface 35 the quotient Q has a low value, for example 1.

Figure 28E:
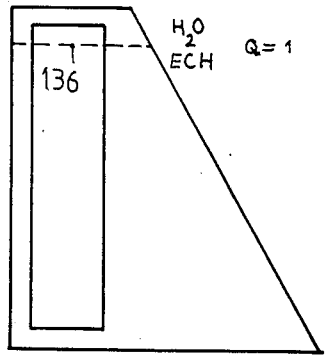
Figure 28F:
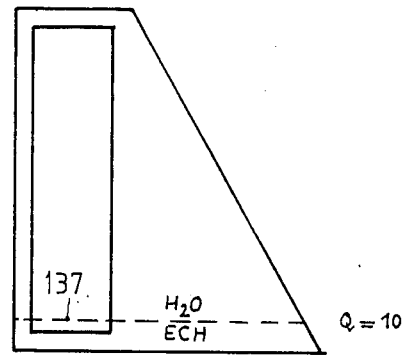
Figure 30C:
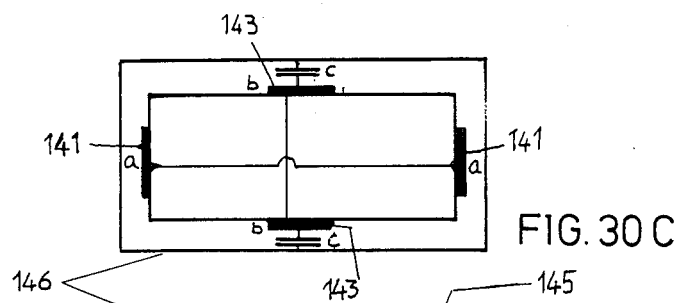
Figure 30A:
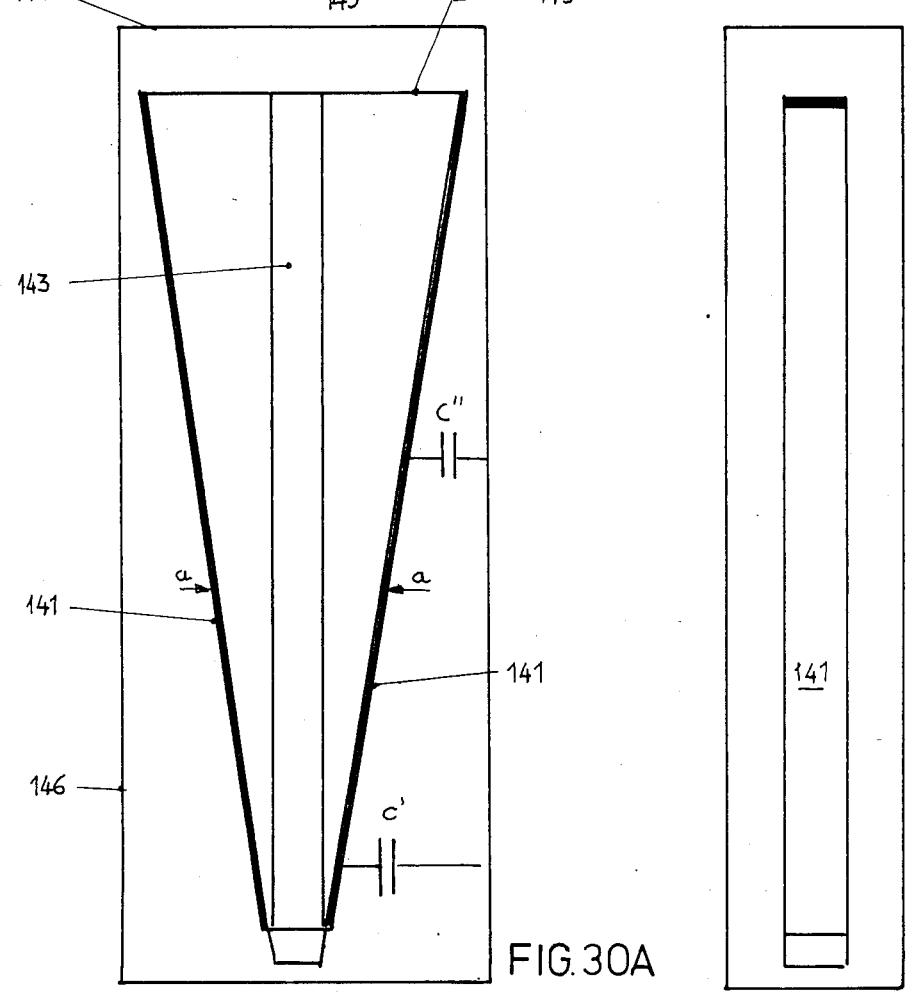
Figure 30B:
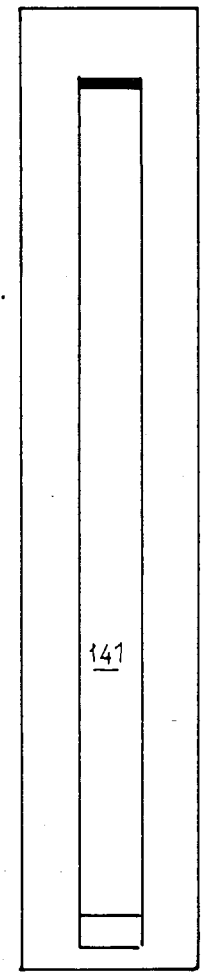
Figure 30D:
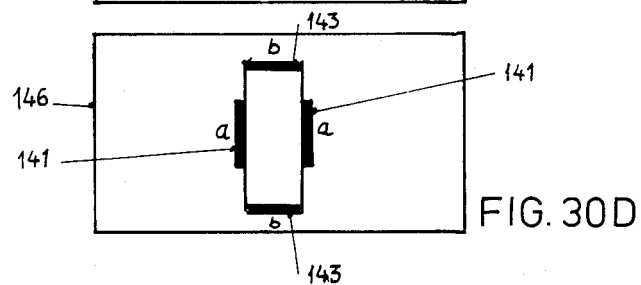

Thus with rising interface, the quotient Q decreases. That is illogical. Therefore in FIGS. 28E and F the measuring tube has been reversed. Now in FIG. 28E is a small quantity of H$_2$O, so when the interface 36 lies high in the vessel it is accompanied with a low value of Q, for example 1. In FIG. 28F, when the vessel is almost completely filled with water, the interface 37 lies down in the vessel and that means a high value of Q, for example 10. Hence an increasing quantity of water is now accompanied with a greater value of Q.

FIGS. 29A-E show a second embodiment of the invention in a front view (A), side view (B), plan- and bottom view (C, D). The measuring electrode 141 and the compensation electrode 143 are constructed as a double, that means: they are provided on both sides of a four sided electrode carrier 145. Due to this symmetrical construction of the electrodes on the carrier 145, not only the precision is improved in first instance, but the response-sensitivity; this can lead to a still higher precision. The electrodes of like function are opposite each other and are connected-through electrically, as clearly shown in FIG. 29C. Around the whole assembly a measuring tube 146 has been placed, which is straight, because the measuring electrodes 141 are provided on the slanting sides of the carrier 145.

In FIGS. 30A-D the electrode carrier 145′ is reversed with respect to the electrode carrier 145 of FIG. 29 and can therefore be used in a 'reversed' liquid system.

Figure 31B:
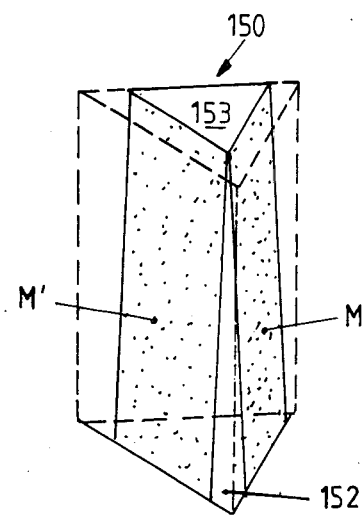

FIGS. 31A-B show a variant of the electrode carrier 145 of FIG. 29, which is there in cross-section rectangular, whereas this variant is here in cross-section triangular. In FIG. 31A a plan view is shown and in FIG. 31B a perspective view. In this variant an electrode carrier 150 is shown with three sides 147, 148 and 149. The sides 147 and 148 are inclined and carry the measuring electrodes M and M′. The third side is straight and carries the compensation electrode R.

Not only in FIG. 31B but also in the plan view of FIG. 31A, it is clearly shown that the cross-section triangle 152 at the bottom has a greater surface than the cross-section triangle 153 at the top. In FIG. 31A is also drawn with a dotted line, around the triangular electrode carrier 150, the measuring tube 154, having the shape of a rectangular, three-sided parallelepiped.

Figure 31C:
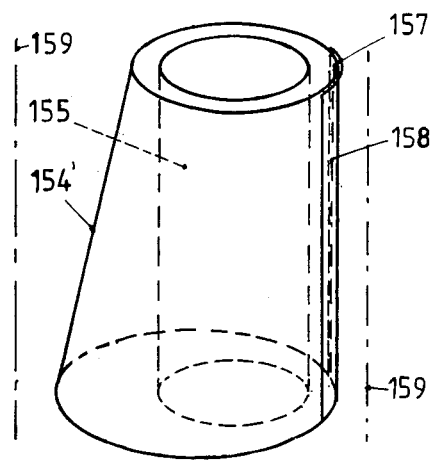

It will be clear that also a conically shaped or other body of revolution is very suitable for use in a level gauge according to the invention. In FIG. 31C such a conical level gauge is represented at least as far as the measuring tube is concerned. The electrode carrier 155 is, however, cylindrical. At the place where the compensation electrode 157 is provided, also the conical measuring tube has a straight generatrix 158. Also here again the electrode carrier can be made conical, for example such as the body 154, and provides thereabout a straight measuring tube, such as indicated with dotted lines 159.

FIGS. 32A-E show various possibilities to combine two different level groups, so that they are suitable for interface measurements in a combination of a 'normal' and a 'reversed' two-liquid layer system.

In FIG. 32A is shown the combination of a level gauge 161 for a normal liquid system and a level gauge 162 for a reversed liquid system. Since the measuring electrode 163 is straight, the cooperating sides 166, 167 of the measuring tube sections 168, 169 are inclined and the measuring tube—as-a-whole—exhibits a convex (or salient) kink.

FIG. 32B shows a combination of a level gauge 171 for a normal liquid system and therebelow e level gauge 172 for a reversed liquid system. Thereby the measuring tube—as-a-whole—175 exhibits a concave (or reentrant) kink.

In FIGS. 32C and D the kink is present in the combined measuring electrode 177 and 178 resp.

In FIG. 32E is shown that also in such a combination the compensation electrode can have a kink, provided the opposite wall 182 of the measuring tube 185 exhibit the same inclination and kink. Of course, the wall 183 opposite the measuring electrode 186 should also have a kink.

If such level gauge must bridge-over great differences in height for only one liquid system, the dimensions in the transverse directions (due to the inclination of the slanting sides) can become unacceptably great. It is recommended to off-set the exterior plate of the capacitor for example every few meters. This has been done in FIGS. 33A, B for the total measuring tube (thus the 'external' capacitor plate). It consist here in fact of 107 individual measuring tube sections of for instance each 1.5 m of length, in which the measurement electrode itself is correspondingly divided into sub-electrodes being mutually insulated. The measuring electrode has become, by this fact, an electrode with sub-electrodes, in which each sub-electrode takes care of a part of the scale-range. After passing completely a sub-electrode the gauge indicates 100%; thereafter the next sub-electrode begins again at 0% and increases to 100%, etc. The sub-electrodes are then summed numerically.

EXAMPLE

Coverage With Liquid By 4 Sub-Electrodes Each Of 250 mm Length

The fifth sub-electrode is covered for 50%. The indication is then: $4 \times 250$ mm $= 1000$ mm $+ \frac{1}{2}$ sub-electrode 5 ($=125$ mm); eventual height is then $1000+125=1125$ mm.

I claim:

1. In a vessel holding a liquid a gauge for measuring the height of the liquid in the vessel comprising a measuring electrode (M) and a compensation electrode (R) in the vessel, and a circuit which measures the capacitance $C_M$ of the measuring electrode and the capacitance $C_R$ of the compensation electrode, each with respect to a wall of the vessel as counter-electrode, using the liquid in the vessel as dielectric, whereby the quotient $C_M/C_R$ varies with the height of the liquid in the vessel, characterized in that the measuring electrode and the compensation electrode are parallel and of the same length, but differ in surface area and shape to such extent that said quotient varies as a linear function of the height of the liquid in the vessel.

2. In a vessel holding a liquid, a gauge according to claim 1 wherein the compensation electrode is rectangular and the measuring electrode has the shape of a right angled triangle.

3. In a vessel holding a liquid, a gauge according to claim 2 wherein the slanting side of the triangle has a stepwise profile.

4. In a vessel holding a liquid, a gauge according to claim 1 wherein the compensation electrode has the shape of a right angled triangle and the measuring electrode has the shape of a parabola.

5. In a vessel holding a liquid, a gauge according to claim 1 wherein the compensation electrode is provided on one side of an insulating substrate and the measuring electrode is provided on another side of said substrate.

6. In a vessel holding a liquid, a gauge according to claim 1 wherein the compensation and measuring electrodes are in the form of spacial wire-work bodies.

7. In a vessel holding a liquid a gauge for measuring the height of the liquid in the vessel comprising a measuring tube, a measuring electrode (M) and a compensation electrode (R) in the vessel, and a circuit which measures the capacitance $C_M$ of the measuring electrode and the capacitance $C_R$ of the compensation electrode, each with respect to a wall portion of the measuring tube as counter-electrode, using the liquid in the vessel as dielectric, characterized in that the measuring electrode and the compensation electrode are parallel and of the same length, the measuring electrode is arranged opposite to said wall portion of the measuring tube, and the horizontal distance between the measuring electrode and said wall portion varies with the height at which such distance is measured, while the distance between the compensation electrode and the measuring tube is constant, whereby the quotient $C_M/C_R$ varies as a linear function of the height of the liquid in the vessel.

8. In a vessel holding a liquid, a gauge according to claim 7 wherein the wall portion of the measuring tube is in the form of steps, and the measuring electrode is divided into mutually separated sub-electrodes corresponding to said steps.

9. In a vessel holding a liquid, a gauge according to claim 8 wherein a measuring electrode and a compensation electrode are arranged above another measuring electrode and compensation electrode, the upper electrodes being a mirror image of the lower electrodes and being adapted to measuring the height of an upper interface, while the lower electrodes are adapted to measure the height of a lower interface.

* * * * *